United States Patent [19]

Kimura et al.

[11] Patent Number: 4,740,939
[45] Date of Patent: Apr. 26, 1988

[54] APPARATUS FOR REPRODUCING INFORMATION RECORDED ON A DISK

[75] Inventors: Takashi Kimura, Yokohama; Nobutaka Ohnuki, Tokyo; Junichi Ikoma, Yokosuka, all of Japan

[73] Assignees: Hitachi Ltd.; Hitachi Video Eng., Inc., both of Tokyo, Japan

[21] Appl. No.: 865,389

[22] Filed: May 21, 1986

[30] Foreign Application Priority Data

May 22, 1985 [JP] Japan .................. 60-108223
Jul. 10, 1985 [JP] Japan .................. 60-150128

[51] Int. Cl.⁴ .................. G11B 21/08; G11B 21/10
[52] U.S. Cl. .................. 369/33; 360/78; 369/41
[58] Field of Search ............ 369/32, 33, 41; 360/78

[56] References Cited

U.S. PATENT DOCUMENTS

| | | | |
|---|---|---|---|
| 4,330,880 | 5/1982 | Dijk | 369/33 |
| 4,495,608 | 1/1985 | Kimura et al. | 369/33 |
| 4,550,393 | 10/1985 | Sugiyama et al. | 369/33 |
| 4,555,736 | 11/1985 | Mathieu | 369/33 |
| 4,627,043 | 12/1986 | Uehara | 369/33 |
| 4,659,972 | 4/1987 | Uchikoshi et al. | 369/33 |
| 4,698,702 | 10/1987 | Miyake | 369/33 |

Primary Examiner—Steven L. Stephan
Attorney, Agent, or Firm—Antonelli, Terry & Wands

[57] ABSTRACT

In an apparatus for reproducing information recorded on a disk having a tracking servo device for an actuator which directs a read beam to a track of the disk, a first power product is applied to the actuator upon turn-off of the tracking servo system, a velocity of the actuator is detected based on an error signal from the tracking servo device, the velocity of the actuator detected immediately after the start of movement of the actuator is stored, on the basis of the detected result, the subsequent velocity of the actuator is sequentially compared with the initial velocity and the velocity is controlled at a constant value until the actuator reaches a predetermined track.

2 Claims, 9 Drawing Sheets

APPARATUS FOR REPRODUCING INFORMATION RECORDED ON A DISK

BACKGROUND OF THE INVENTION

1. Field of the Invention

The present invention relates to a special reproduction function of an apparatus for reproducing information recorded on a disk (such as an optical disk reproducing apparatus), and more particularly to a control unit suitable to rapidly move an actuator of a reader from one track to another on which information has been recorded.

2. Description of the Prior Art

In a known optical disk reproducing apparatus, when pickup means for reading information recorded on the disk is to be moved from a current track to a track displaced therefrom by several tens to several hundreds tracks, it is usually moved to an adjacent track by one track by incremental movement or jump, and this operation is repeated by a desired number of times. In the jump operation, a tracking control loop which has a function to cause the pickup means to precisely follow the target track is opened, and a certain power product is applied to the pickup means until it reaches a midpoint between the adjacent tracks. After the pickup means has passed the midpoint, the tracking control loop is closed and a power product which is opposite in polarity and equal in magnitude to the previously applied power product is applied to move the pickup means to the adjacent track. (For example, Japanese Unexamined patent publication No. 58-187086).

A loss of energy during each jump operation can be automatically corrected by the tracking control loop but a time is requried to complete the correction. As a result, a certain margin time is required from the end of the first jump operation to the start of the next jump operation. In this system, therefore, an average pickup velocity is much lower than the highest possible velocity of the pickup means. Instead of the method in which the pickup means is moved to the adjacent track by one track in every jump operation, the pickup means may be moved by a plurality of tracks in every jump operation.

In such multi-jump operation, feed operation for the pickup on which an actuator is mounted is temporarily stopped and only the actuator is moved. The actuator is usually supported to the pickup by a suspension spring. Thus, after the actuator has been moved to the target track, the pickup is moved to follow it. This is essentially different from a random access function in which the pickup is rapidly moved and then the one-track jump of the actuator is repeated around the target track to move the actuator onto the target track.

The multi-jump operation is used when it is required to precisely and rapidly move the actuator by a predetermined number of tracks within a movable range of the actuator permitted on the pickup. However, when the actuator is continuously moved over a plurality of tracks, an affect of a resonance characteristic of the actuator of the pickup means remarkably appears and the actuator may be vibrated during the movement across the tracks. As a result, an instantaneous velocity always varies and the setting of the actuator on the target track and the jumping of the actuator by the predetermined number of tracks are difficult to attain.

SUMMARY OF THE INVENTION

It is an object of the present invention to provide an apparatus for reproducing information recorded on a disk which can rapidly and precisely move an actuator of pickup means for reproducing the recorded information by a predetermined number of tracks.

In order to achieve the above object, in accordance with the present invention, drive means (hereinafter called as an actuator) is continuously moved by a desired number of tracks in one jump operation. In order to stabilize the operation of the actuator, a velociy of the actuator immediately after the start of movement is detected and a reference signal is generated based on the detected velocity. The velocity of the actuator is controlled such that it always matches to the velocity indicated by the reference signal. Since the reference signal is generated based on the velocity immediately after the start of movement of the actuator, the overall velocity is low because the velocity immediately after the start of movement is not high, but the setting to the target track is improved. The velocity of the actuator after a certain time has elapsed since the start of movement is higher than that immediately after the start of movement. If the reference signal is generated based on such a velocity, the overall velocity is high but overrun occurs in setting the actuator onto the target track and rapid setting is difficult to attain.

Thus, in the present invention, the velocity immediately after the start of movement of the actuator and the velocity when the actuator has been moved over several tracks are detected, reference signals are generated based on the respective detected velocities, and those reference signals are selectively used to move the actuator at a high speed during the continuous movement and at a low speed immediately before the actuator reaches the target track.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

An information bearing disk has been known as a device to record therein a video or data signal. Optical read type, electrostatic effect read type, and electromechanical read type information bearing disks have been known. The present apparatus may be applied to any type of information bearing disks. In the following description of the embodiments, a disk having optical readout means (hereinafter referred to as an optical disk) is explained.

A groove of the optical disk is spiral like that of a sound record disk and a reader tracks the groove. In an optical disk which records therein a television signal, one frame of the television signal is recorded on each turn. The recording is usually made by frequency-modulating the synchronized complete television signal.

Figure 1:
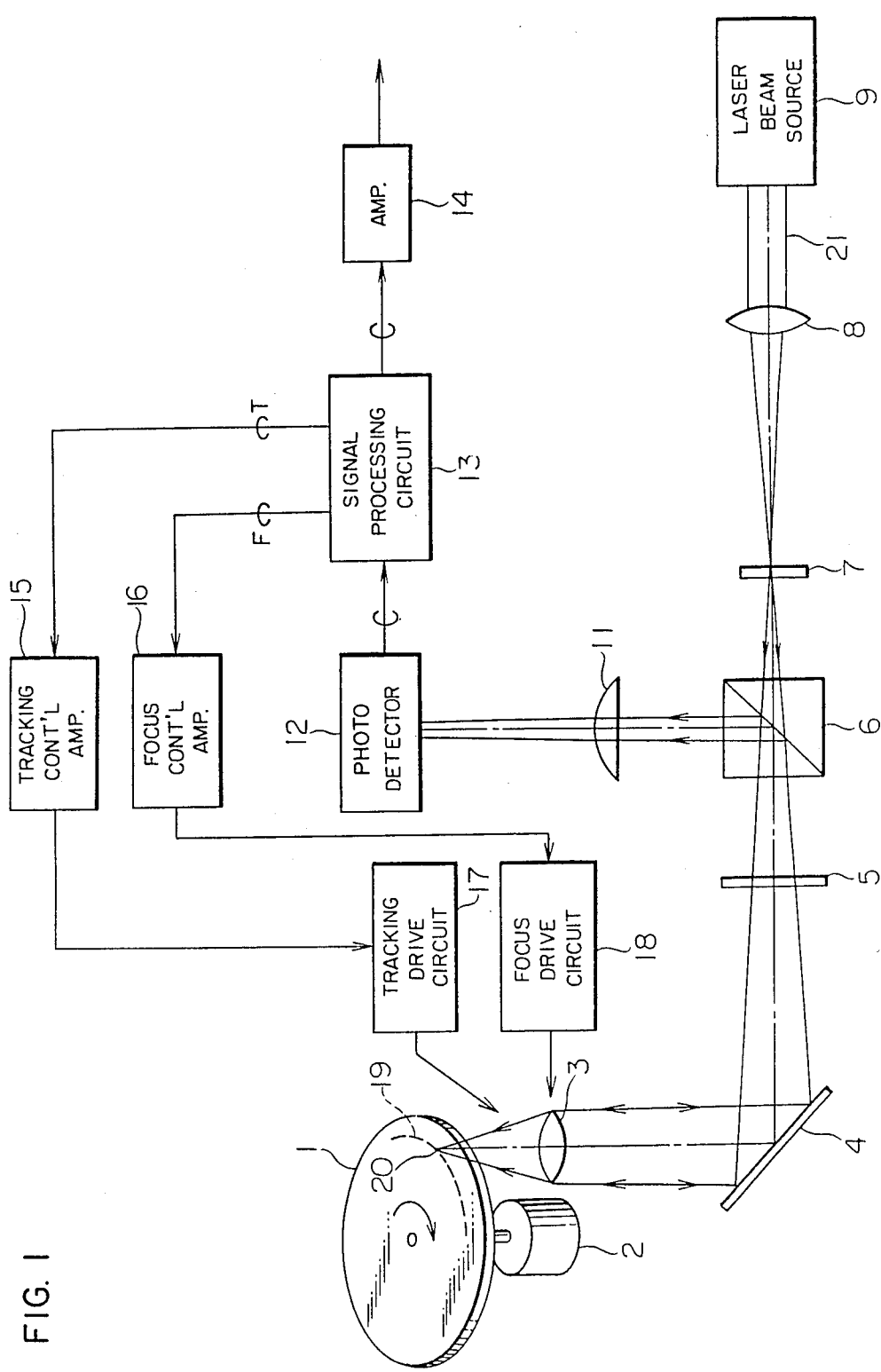
FIG. 1 is a block diagram of an optical disk reproducing apparatus.

FIG. 1 is a block diagram of the optical disk reproducing apparatus. The optical disk 1 has a central aperture and is fixed to the reproducing apparatus. The optical disk 1 is rotated by a motor 2. Information tracks 19 containing video and audio information have been recorded on the optical disk 1 at a high density. A light beam 21 is irradiated to the information track 19 and desired information is read out of a reflected light therefrom. The light beam 21 is emitted from a laser beam source 9, passes through a condenser lens 8, a diffraction grating 7, a beam splitter 6 and a quarter wavelength plate 5, reflected by a mirror 4 and is focused by an objective lens 3 to a focused spot 20 on the optical disk 1.

As described above, the information has been recorded on the information track 19 of the optical disk 1 as a string of fine projections (which are hereinafter referred to as pits). The focused spot 20 of the light beam 21 has intensity in the reflected light changed by the pits on the information track 19. The reflected light goes back through the objective lens 3, mirror 4 and quarter wavelength plate 5, is separated from the incident beam by the beam splitter 6 and is directed to a photo-detector 12 through a cylindrical lens 11. An output G from the photo-detector 12 contains the information read from the optical disk 1 as well as a light beam focus status signal and an information track tracking status signal. A focus error signal F, a tracking error signal T and an information signal I are separated by a signal processing circuit 13. The information signal I is supplied to an amplifier 14 for use in reproducing the recorded information. The focus error signal F is amplified by a focus control amplifier 16, an output of which is applied to a focus drive circuit 18 which vertically drives the objective lens 3 to control focusing of the spot 20 of the light beam.

The tracking error signal T is amplified by a tracking control amplifier 15, an output of which is applied to a tracking drive circuit 17 which drives the objective lens 3 normally to the information track 19 (radial direction of the disk) to control tracking of the spot 20. The outline of the optical disk reproducing apparatus has thus been described. The explanation for the portion not pertinent to the tracking control of the present invention is omitted. In the above explanation, when the tracking control is effected, the objective lens is driven. Since the object lens is not driven in other system (for example, angle control of the mirror 4), the portion which functions to cause the spot to follow the information track is called as the actuator.

Figure 2:
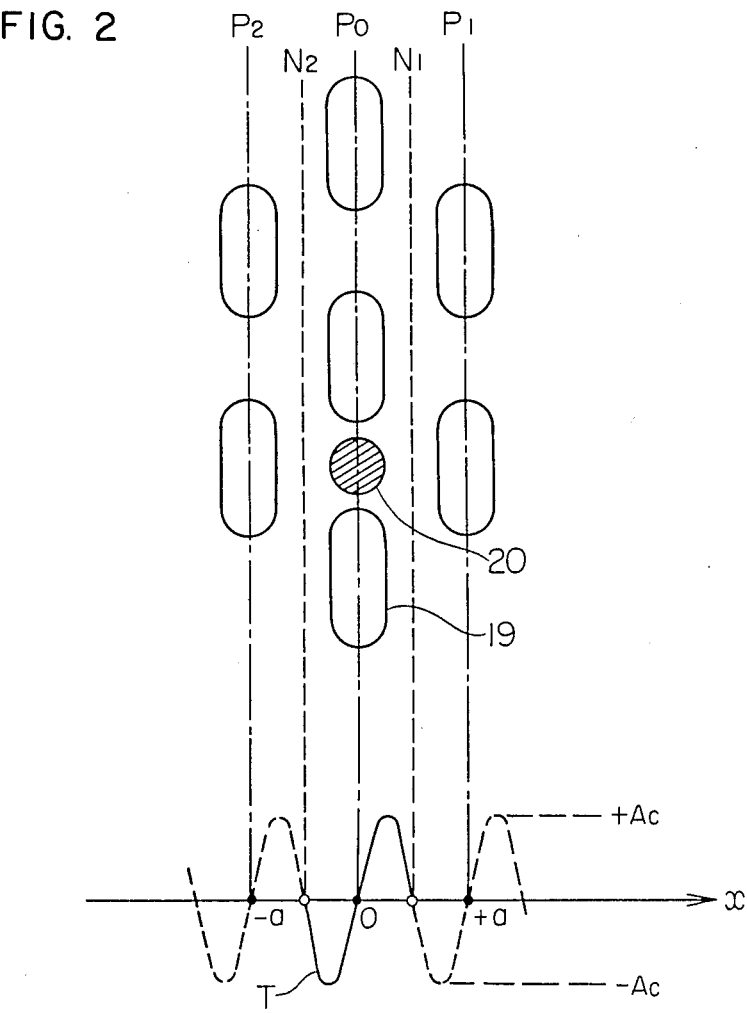
FIG. 2 shows a plan view and a characteristic chart for illustrating a tracking control operation.
Figure 5:
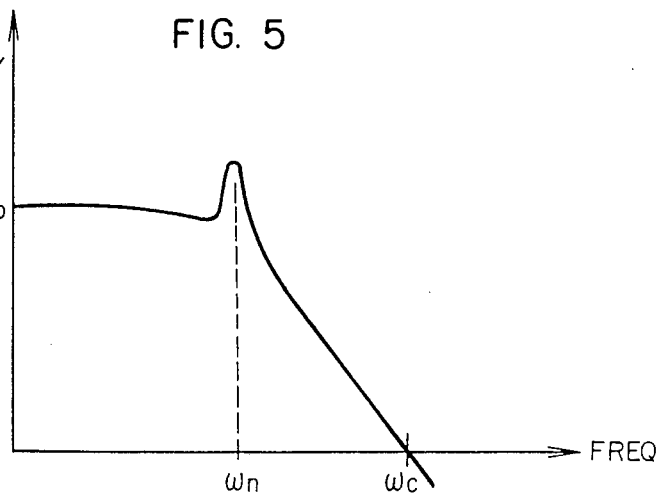
FIG. 5 is a frequency characteristic chart for showing a dynamic characteristic of an actuator.
Figure 3:
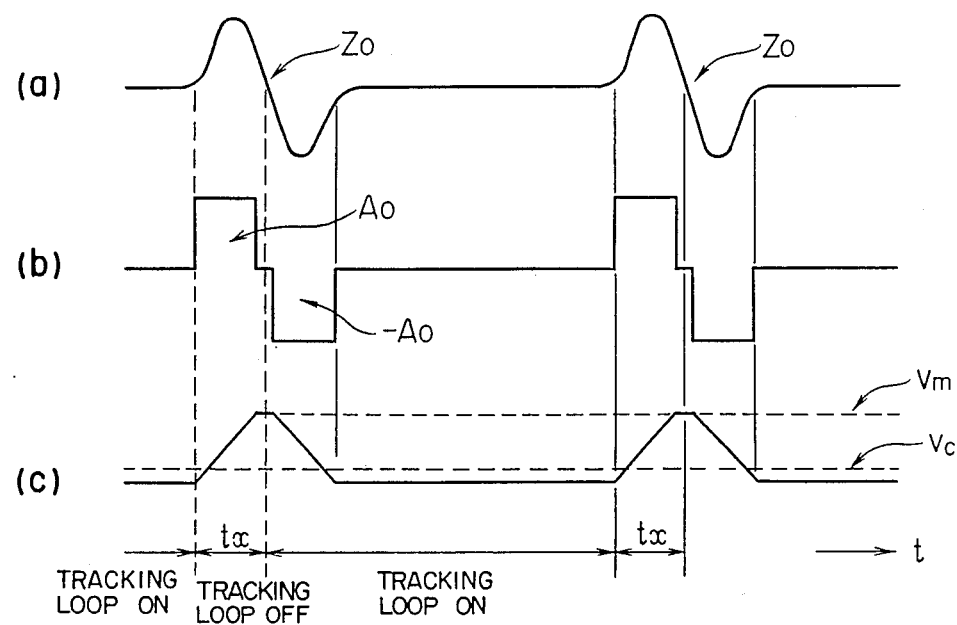
FIGS. 3 and 4 are characteristic charts for showing a principle of track jump operation of the present invention.
Figure 4:
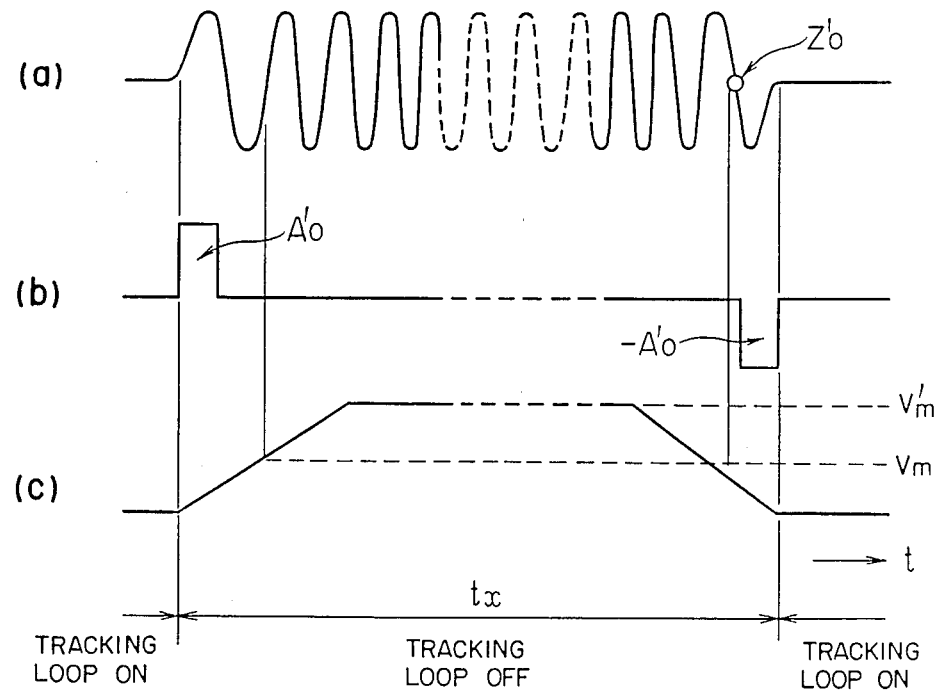

Referring to FIGS. 2, 3, 4 and 5, a principle of operation of the present invention is explained. FIG. 2 shows a characteristic chart of a detection characteristic of the tracking control system of the present invention together with a plan view of the tracks, FIG. 3 shows a waveform of a control signal when the actuator is to be continuously radially moved across the tracks (jump operation), FIG. 4 shows a frequency characteristic chart of a dynamic characteristic of the actuator, and FIG. 5 shows operational waveforms of the present apparatus.

In FIG. 2, numeral 19 denotes an enlarged information track (plan view). The information signal is recorded as strings of pits $P_0$, $P_1$, $P_2$. Numeral 20 denotes a spot light focused by the objective lens 3 on the disk 1. As the disk 1 is rotated, the spot light 20 precisely traces the string of pits $P_2$ and the reflection light of the spot light irradiated to the pit 19 is detected. The shape and depth of the pits are selected such that when the spot light is irradiated to the pit 19, no reflection light is directed to the photo-detector 12, and when the spot light is irradiated to a flat area between the pits, the reflection light is directed to the photo-detector 12. Since the information track is spirally formed on the disk, the pickup on which the actuator is mounted is moved radially of the disk from an inner periphery to an outer periphery as the disk is rotated. Thus, the spot light 20 is moved from the string of pits $P_2$ to the string of pits $P_1$ as the disk is rotated.

In order to cause the spot light 20 to precisely track the pit train, the actuator may be tracking-controlled radially of the disk. For example, a tracking error signal shown in FIG. 2 is generated by opto-electrical means and a negative feedback control is effected to set the tracking operation at a position shown by a dark dot. A detection characteristic of the tracking control loop is shown by a solid curve T in FIG. 2. The dark dot indicates a normal tracking position and a white dot shows a mid-point between adjacent information tracks.

It is a feature of the optical disk reproducing apparatus that the read beam can be rapidly moved from the current information track to another information track (random access). During such operation, it is necessary to open the tracking control loop and move the pickup radially of the disk. As the read beam sequentially crosses the information tracks, a sinusoidal continuous signal as shown in FIG. 2 is produced as the tracking error signal.

Referring to FIG. 3, the operation when the read beam is to be moved to the next adjacent information track is explained. FIG. 3(a) shows a tracking error signal waveform, FIG. 3(b) shows an input voltage waveform to the driver which drives the actuator in the tracking direction, and FIG. 3(c) shows an actuator velocity curve in which an abscissa represents a time. In one jump operation, the tracking control loop is opened (turned off) and a pulse $A_0$ is applied to apply a power product to the actuator until the actuator reaches the mid-point of the tracks. After the actuator has passed the mid-point, that is, when a zero-crossing point of the tracking error signal is detected, the tracking control loop is closed (turned on) and a pulse $-A_0$ which is opposite in polarity and equal in amplitude to the pulse $A_0$ is applied to generate a power product of the opposite polarity to move the actuator to the adjacent track.

The actuator is accelerated during a period $t_x$ in which the tracking control loop is off so that the velocity of the actuator reaches the highest velocity $v_m$. As the tracking error signal crosses the zero-crossing point $Z_0$, the tracking control loop is turned on to decelerate the movement of the actuator.

In such jump operation, a certain margin time is necessary between the end of one jump operation and the start of the next jump operation. This time includes a time required for the tracking error signal to become sufficiently small after the tracking control loop has been turned on and a time required for the tracking control in the adjacent track to be terminated. If the one track jump operation is repeatedly carried out to move the actuator across a plurality of tracks, an average velocity $v_o$ is much lower than the highest velocity $v_m$ because of the margin time.

Referring to FIG. 4, an operation for continuously moving the actuator across a plurality of tracks in one jump operation is explained. FIG. 4(a) shows a waveform of the tracking error signal, FIG. 4(b) shows an input voltage waveform to a driver which drives the actuator in the tracking direction, and FIG. 4(c) shows a velocity curve of the objective lens in which an abscissa represnts a time. The tracking control loop is turned off and a power product $A_0$ is applied to the actuator until the actuator reaches the mid-point between the tracks. The velocity of the actuator reaches the highest velocity $v_m$ when the tracking error signal crosses the zero-crossing point $Z_0$. If no external force is applied to the actuator at this time, the velocity of the actuator is reserved and the actuator goes across the plurality of tracks at the highest velocity $v_m$. At a midpoint $Z_0'$ between the target track and the adjacent rrack, the tracking control loop is turned on and a power product $-A_0$ which is opposite in polarity and equal in magnitude to the previously applied power product $A_0$ is applied to the actuator so that the actuator is decelerated and set to the target track. Unlike the one track jump operation, this operation necessiates no margin time to the next jump operation. Thus, the actuator can be moved at the highest velocity across the plurality of tracks during the off period $tx'$ of the tracking control loop.

FIG. 5 shows a frequency characteristic of an actuator displacement to a current supplied to an excitation coil of the actuator. The coil is wound on the actuator which is placed in a fixed magnetic field developed by a permanent magnet. When the current is supplied to the coil from the driver, the actuator is driven in the tracking direction by an interaction between a magnetic field developed by the coil and the fixed magnetic field.

The frequency characteristic of the actuator to the drive current is represented by a two-dimensional delay element G(s) shown below by a spring action of a suspension spring which supports the actuator.

$$G(s) = \frac{g\omega_n^2}{S^2 + 2\xi\omega_n S + \omega_n^2} \quad (1)$$

where g is a D.C. sensitivity, $\omega_n$ is a specific frequency, $\xi$ is an attenuation coefficient and S is a complex number. The attenuation coefficient $\xi$ of the actuator for the suspension spring is normally very small and has a resonance peak at the specific frequency $\omega_n$. FIG. 5 shows a gain of G(s) in which an ordinate represnts an actuator sensitivity and an obscissa represents. a frequency.

When the actuator is moved at the highest velocity, the velocity of the actuator after the turn-off of the tracking control loop and the application of the first power product is oscillative as seen from the frequency characteristic of the actuator, and the velocity of the actuator is reduced by the reaction of the suspension spring for the actuator. As a result, it is difficult to stop the actuator at the desired track by the second power product.

In order to eliminate the influence by the reaction of the suspension spring, a force is applied to the actuator in accordance with the number of tracks across which the actuator is to be moved, and in order to keep the velocity of the actuator constant, the velocity of the actuator immediately after the application of the first power product is detected and held and on the basis of the result of the detection the subsequent velocity of the actuator is sequentially compared with the initial velocity so that the velocity is kept constant until the actuator reaches the predetermined track.

Figure 6:
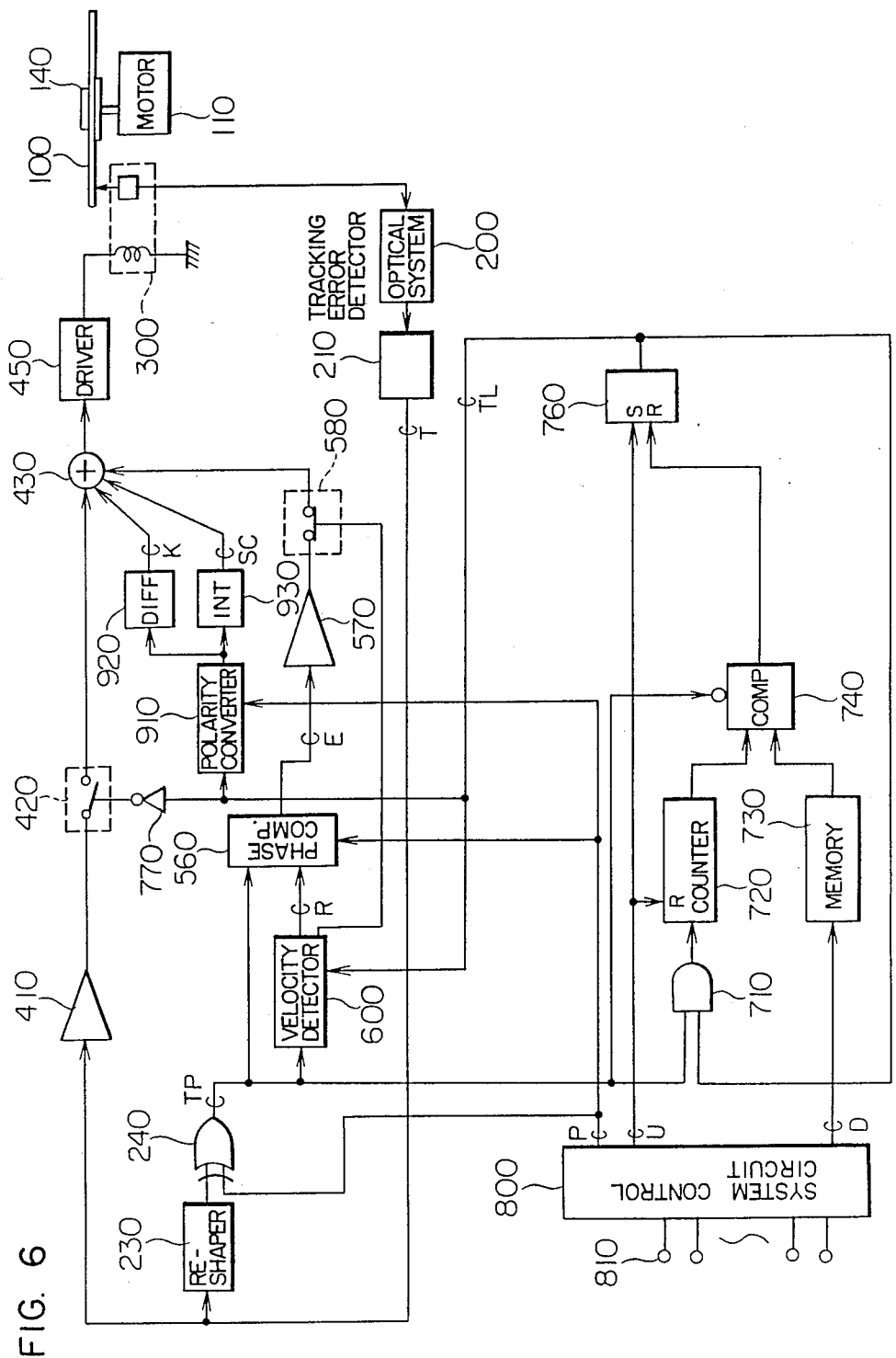
FIG. 6 is a block diagram of one embodiment of the present invention.
Figure 7:
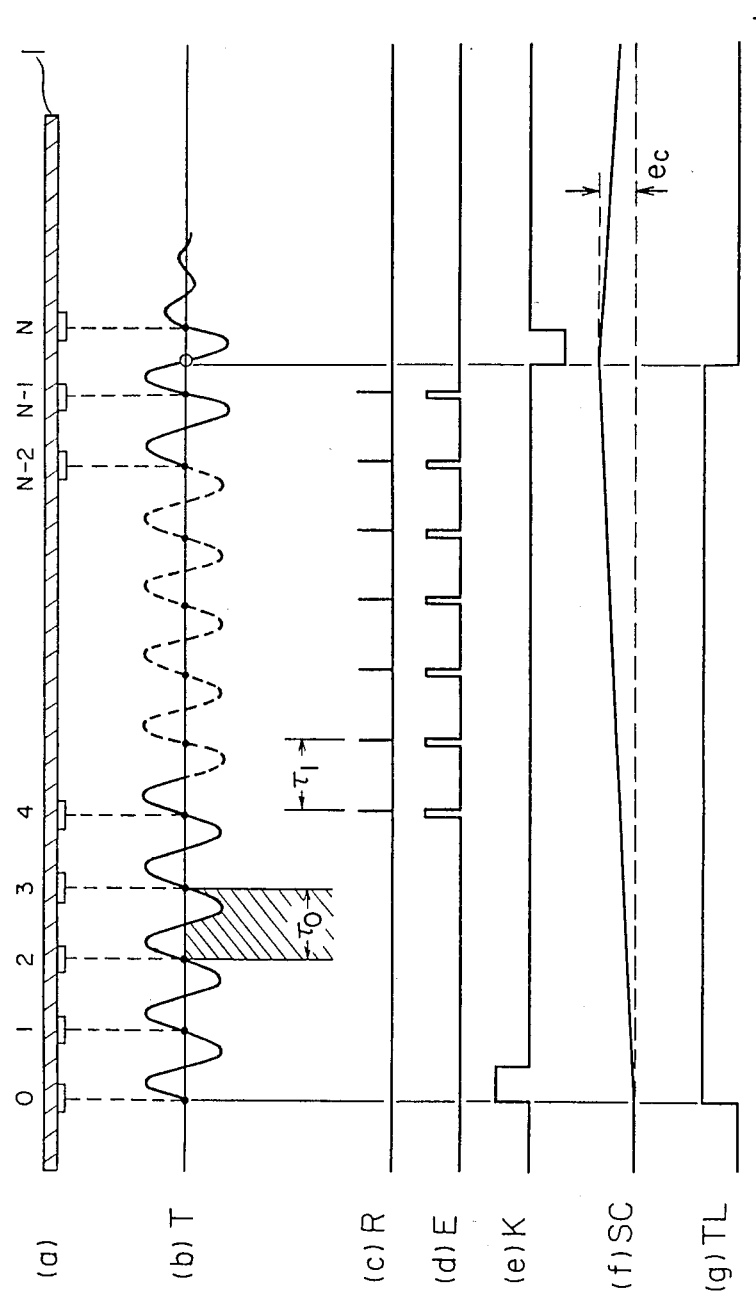
FIG. 7 shows signal waveforms of signals in FIG. 6.

Referring to FIGS. 6 and 7, one embodiment of the present invention is explained. Numeral 100 denotes a disk which is fixed to a disk motor 110 by a disk retainer 140. The disk 100 is rotated by the disk motor 110. Numeral 300 denotes an actuator for moving a read beam on a disk surface. It is used to read out information from the optical disk together with an optical system 200. A detection signal from the optical system 200 is supplied to a tracking error signal detector 210 which produces a tracking error signal T. The processing of main information read from the disk is not illustrated.

The output signal from the detector 210 is supplied to a waveform reshaper 230 and a phase compensation amplifier 410. The tracking error signal amplified by the phase compensation amplifier 410 is supplied to a loop switch 420. The loop switch 420 is closed in a normal reproduction mode so that the tracking control loop is turned on and the output of the phase compensation amplifier 410 excites the actuator 300 through an adder 430 and a driver 450. The actuator 300 develops a force proportional to a current supplied to the coil to drive the actuator 300 radially of the disk.

Numeral 800 denotes a system control circuit which is constructed by a micro-processor and control the optical disk reproducing apparatus in accordance with a command applied to terminals 810.

The continuous jump operation is now explained. FIG. 7(a) shows a partial sectional view of the optical disk 1. It shows information tracks. Let us assume that the read beam is moved from a track O to a track N, namely, from an inner periphery to an outer periphery. As the continuous jump command and the number of tracks for jump are applied to the terminal 810, the system control circuit 800 sends a binary-converted number D of tracks for jump to a memory 730. It also sends a jump direction signal P for indicating the direction of jump (from the inner periphery to the outer periphery or vice versa) to an output voltage polarity converter 910 and an exclusive OR circuit 240. As a jump trigger signal J is applied to a set terminal S of an RS flip-flop 760, the flip-flop 760 is set and an output thereof, a tracking loop signal TL assumes a high level as shown in FIG. 7(g). This output is applied to the loop switch 420 through an inverter 770 so that the loop is turned off during the high level period of the output of the flip-flop 760. The signal TL is also supplied to the output voltage polarity converter 910, which produces a positive output or a negative output depending on the jump polarity signal P. The output of the polarity converter 910 is supplied to a differential and reshaping circuit 920 and an integration circuit 930. The circuit 920 differentiates the output of the output voltage polarity converter 910 and reshapes it to produce a first power product pulse shown in FIG. 7(e). This pulse is supplied to the actuator 300 through the adder 430 and the driver 450. As a result, the actuator 300 starts the continuous jump operation in the direction determined by the jump polarity signal P.

As a result, the sinusoidal tracking error signal T having a period equal to the track interval which is repeated successively as shown in FIG. 7(b) appears in the output of the tracking error detector 210. The signal T is shpaed into a rectangular wave by the reshaping circuit 230. The output of the reshaping circuit 230 is supplied to the EX-OR circuit 240 and an effective edge is descriminated by the prerriously applied jump polarity signal P. The output of the EX-OR circuit 240 is sent to a counter 720 through an AND circuit 710 so that the counter 720 counts the number of tracks for jump. It is also supplied to a velocity detector 600, which detects time points when the actuator 300 posses through the second track and the third track by detecting the zero-crossing points of the tracking error signal T based on the effective edges of the rectangular wave devided from the signal T. The relative velocity of the actuator 300 to the track when the actuator moves between the second and third tracks is detected as a repetition period of the tracking error signal or a time $\tau_0$ of a hatched area is FIG. 7(b). Such detection means may be means for counting pulses by binary counter means which counting means uses a reference clock or means for producing a voltage corresponding to the time $\tau_0$ by a pedestal wave.

Figure 11:
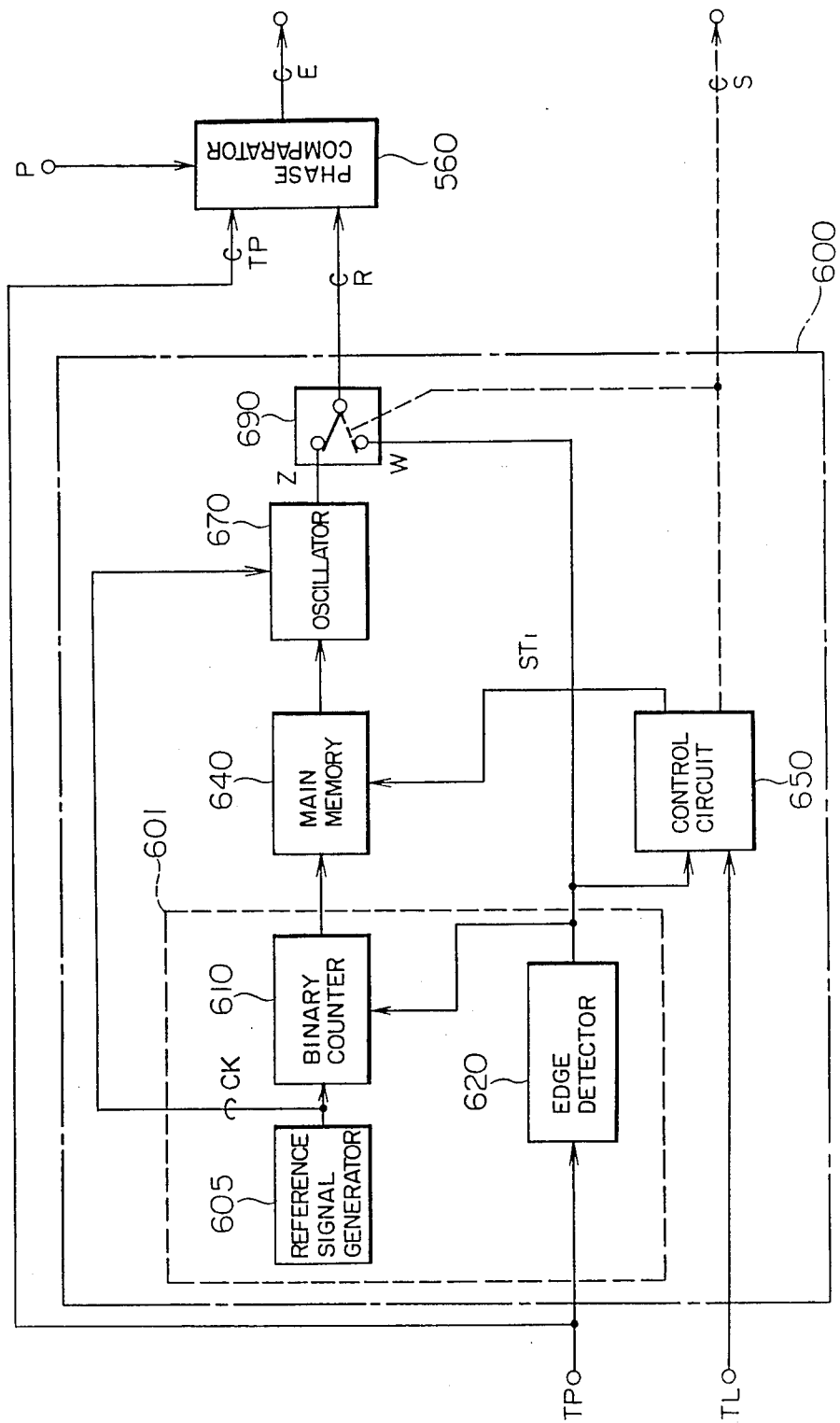

FIG. 11 shows a detailed block diagram of the velocity detector 600. The reshaped tracking error signal TP from the EX-OR circuit 240 is supplied to an edge detector 620, which detects the effective edge when the tracking error signal T zero-crosses from negative to positive. The edge detection signal is supplied to a reset terminal of a binary counter 610 and a control circuit 650. The binary counter 610 is reset by every edge detection signal and it always counts the period of the signal T by using a reference signal CK of a constant frequency generated by a reference signal generator 605. The circuits 605, 610 and 620 form a frequency detector 601. The frequency of the reference signal CK is selected to be sufficiently higher than the frequency of the signal T. The signal TL from the flip-flop 760 is supplied to the control circuit 650. When the signal TL assumes the high level, the control circuit 650 produces a signal $ST_1$ which indicates the hatched period in FIG. 7(b) is synchronism with the edge detection signal, and this signal is supplied to a main memory 640. As a result, the main memory 640 holds the binary data which is produced by the binary counter 610 which counts the period $\tau_1$ of FIG. 7(b). The binary data held in the main memory 640 is supplied to an oscillator 670, which generates a reference signal R having a frequency $f=1/\tau_0$ based on the detection of the period $\tau_0$, by using the reference signal supplied from the circuit 605. The signal R is supplied to a Z terminal of a switch 690. The edge detection signal of the signal T from the edge detector 620 is supplied to a W terminal of the switch 690. The switch 690 is controlled by a control signal from the control circuit 650. The output from the switch 690 is used as the reference signal output R of the velocity detector 600. The signal R is supplied to a phase comparator 560.

Immediately after the start of the jump operation, the switch 690 is connected to the W terminal and the reference signal R is the tracking error signal T. As a result, the phase error signal does not appear at the output of the phase comparator 560. The control circuit 650 keeps the switch 690 connected to the W terminal until the memory circuit 640 completes to hold the binary data for the period of the signal T, and when it completes holding, the control circuit 650 produces a control signal to connect the switch 690 to the Z terminal. The reference signal R is supplied to the phase comparator 560 to which the reshaped tracking error signal TD from the EX-OR circuit 240 is also supplied. If the velocity of the moving actuator varies, the frequency of the tracking error signal varies accordingly. The effective edges of the reference signal R and the tracking error signal are phase-compared by the phase comparator 560 and a phase error signal E representing a frequency difference therebetween is produced. This is shown in FIG. 7(d). The jump polarity signal P is supplied to the phase comparator 560 so that the polarity of the phase detection is reversed depending on the direction of radial movement of the actuator 300 on the disk 100.

The phase error signal E from the phase comparator 560 is applied to a loop switch 580 through a phase compensation amplifier 570. A timing signal S which indicates that the actuator 300 has pussed through the third track is supplied from the velocity detector 600 to the loop switch 580 so that the switch 580 is turned on. The phase error signal E is applied to the actuator 300 through the adder 430 and the driver 450 to establish the velocity control loop. As a result, the phases of the tracking error signal T and the reference signal R are locked, and the frequency of the signal T completely matches to the frequency of the signal R and the velocity of the actuator 300 is kept at the velocity of immediately after the start of the continuous jump operation during the movement of the actuator across the plurality of tracks. The output of the output polarity converter 910 is applied to the integration circuit 930 which produces an integrated output SC shown in FIG. 7(f). The circuit is designed such that a force developed by a gradient of the output cancels the repelling force of the suspension spring for the actuator. As a result, the actuator 300 is not affected by the suspension spring and it can be constantly accelerated and then moved at a constant velocity.

The effective edge of the reshaped tracking error signal T from the EX-OR circuit 240 is supplied to the binary counter 720 through the AND circuit 710. Thus, the edge signal generated when the actuator 300 moves across the track is detected to count the number of jumping tracks by the binary counter 720. The output of the binary counter 720 is applied to a comparator 740 which compares it with the binary data stored in the memory 730. When they are equal, the comparator 740 produces a high level output when the opposite edge signal generated when the actuator 300 moves across the next track. If the binary data corresponding to $N-1$ which is one less than the number N of jumping tracks is stored in the memory 730, the comparator 740 produces the output which assumes the high level when the actuator is one half track before the target track. This output is applied to the reset terminal R of the RS fli-flop 760 to reset the flip-flop. As a result, the output Q of the flip-flop 760 assumes the low level so that the loop switch 580 is opened to terminate the velocity control of the actuator 300. Further, the tracking control loop switch 420 is closed and the loop is turned on, and the reshaping circuit 920 produces a second power product pulse which is opposite in polarity and equal in height and area to the power product pulse applied to accelerate the actuator. This pulse is applied to the actuator 300. As a result, the actuator 300 starts to decelerate and the velocity reaches zero just when the pulse terminates. There is no guarantee that the actuator 300 is on the target track at that moment, but since the tracking control loop is turned on, the correction by the loop is made and the actuator is set on the target track.

In the above description, the continuous jump operation is in one direction. When the jump operation is to take place in the opposite direction, the jump polarity output P from the system control circuit 800 is reversed. As a result, the outputs from the differentiation and reshaping circuit 920, integration circuit 930 and phase comparator 560 are opposite to those shown in FIG. 7. Thus, ever if the polarity of the tracking error signal is reversed, the polarity of the edge in the output of the EX-OR circuit 240 which is generated when the actuator moves across the track is same, and the continuous jump operation to the target track is attained is the similar manner.

Figure 8:
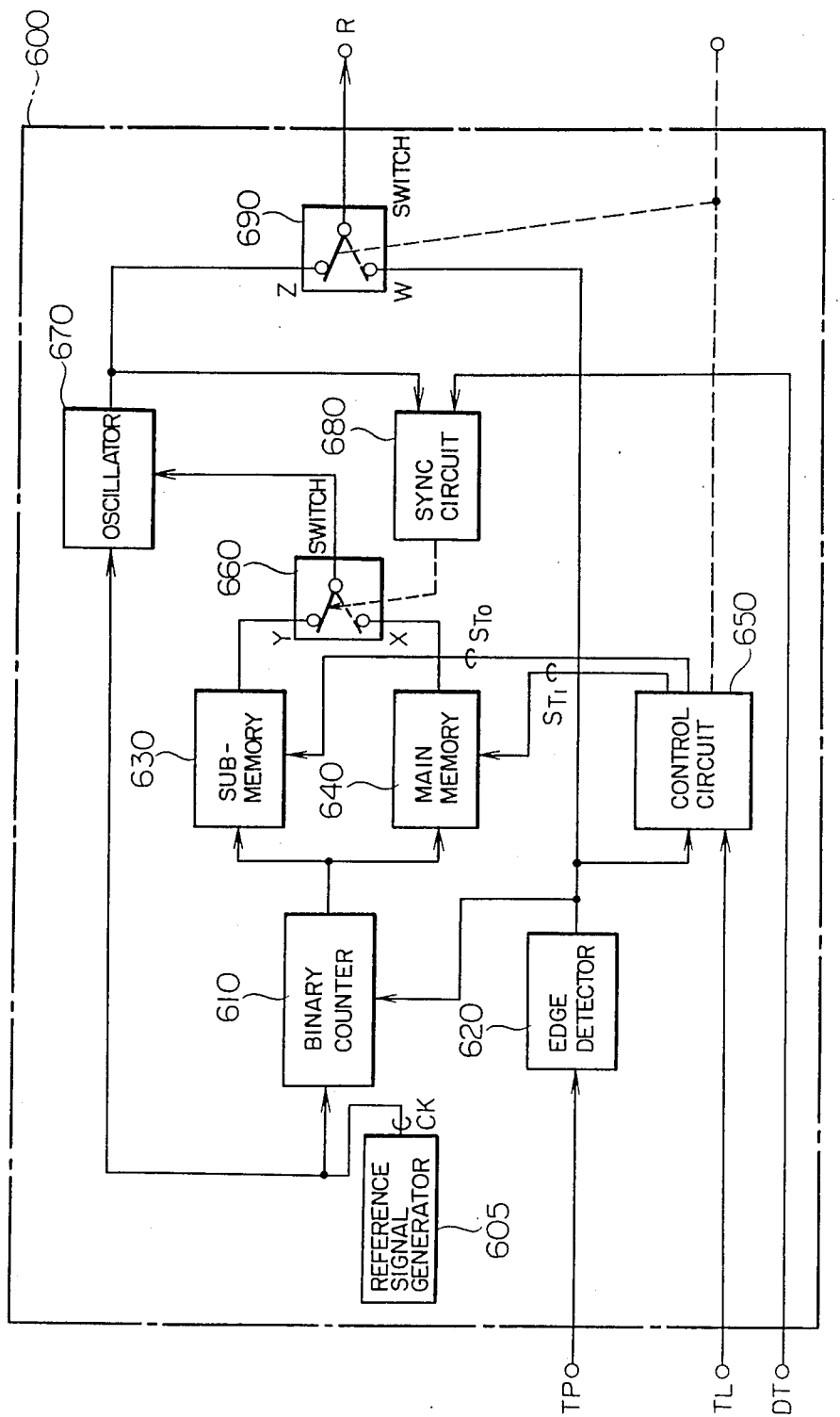
FIG. 8 is a block diagram of another embodiment of the present invention.
Figure 9:
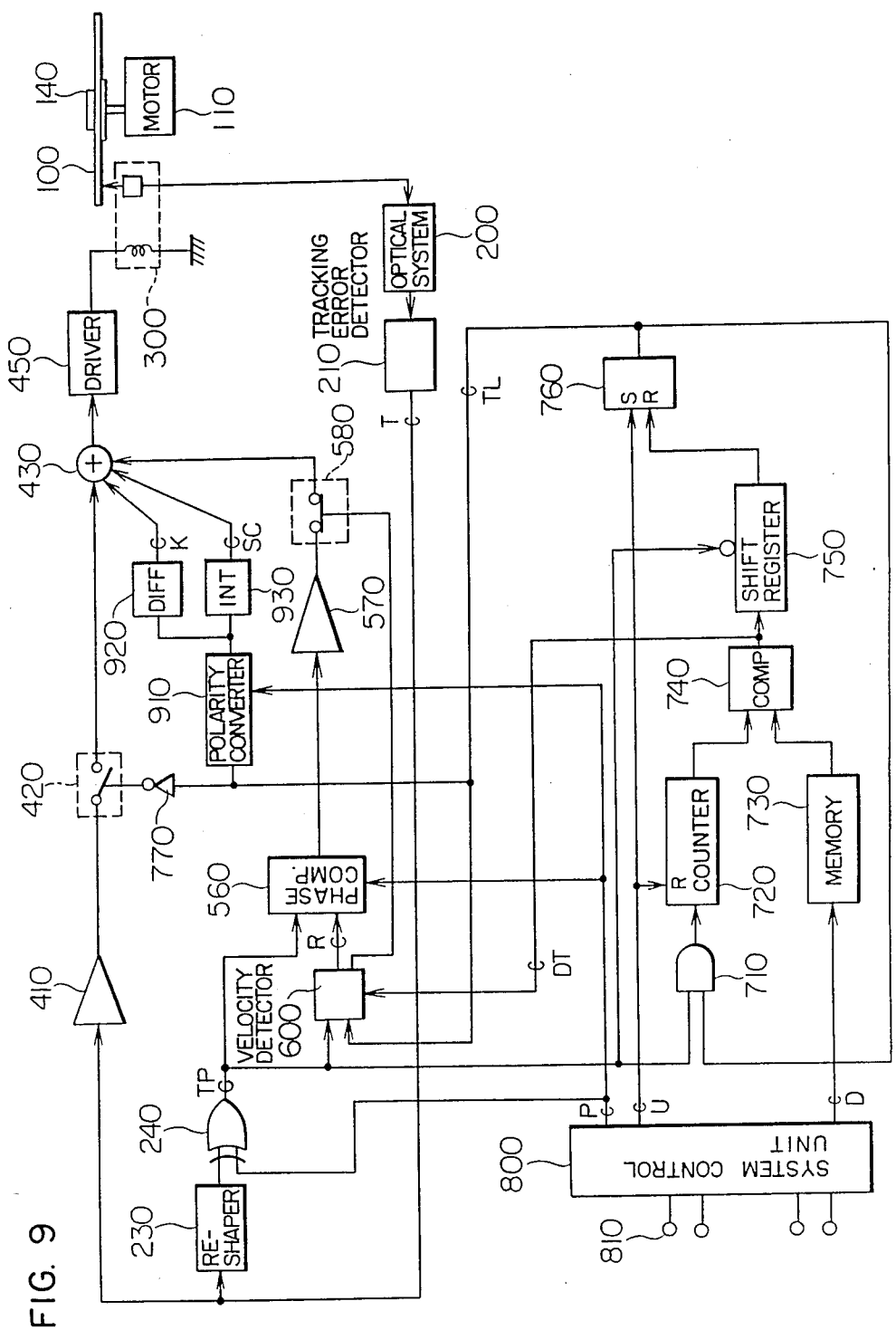
FIGS. 9 and 11 are block diagrams of other embodiments of the present invention.
Figure 10:
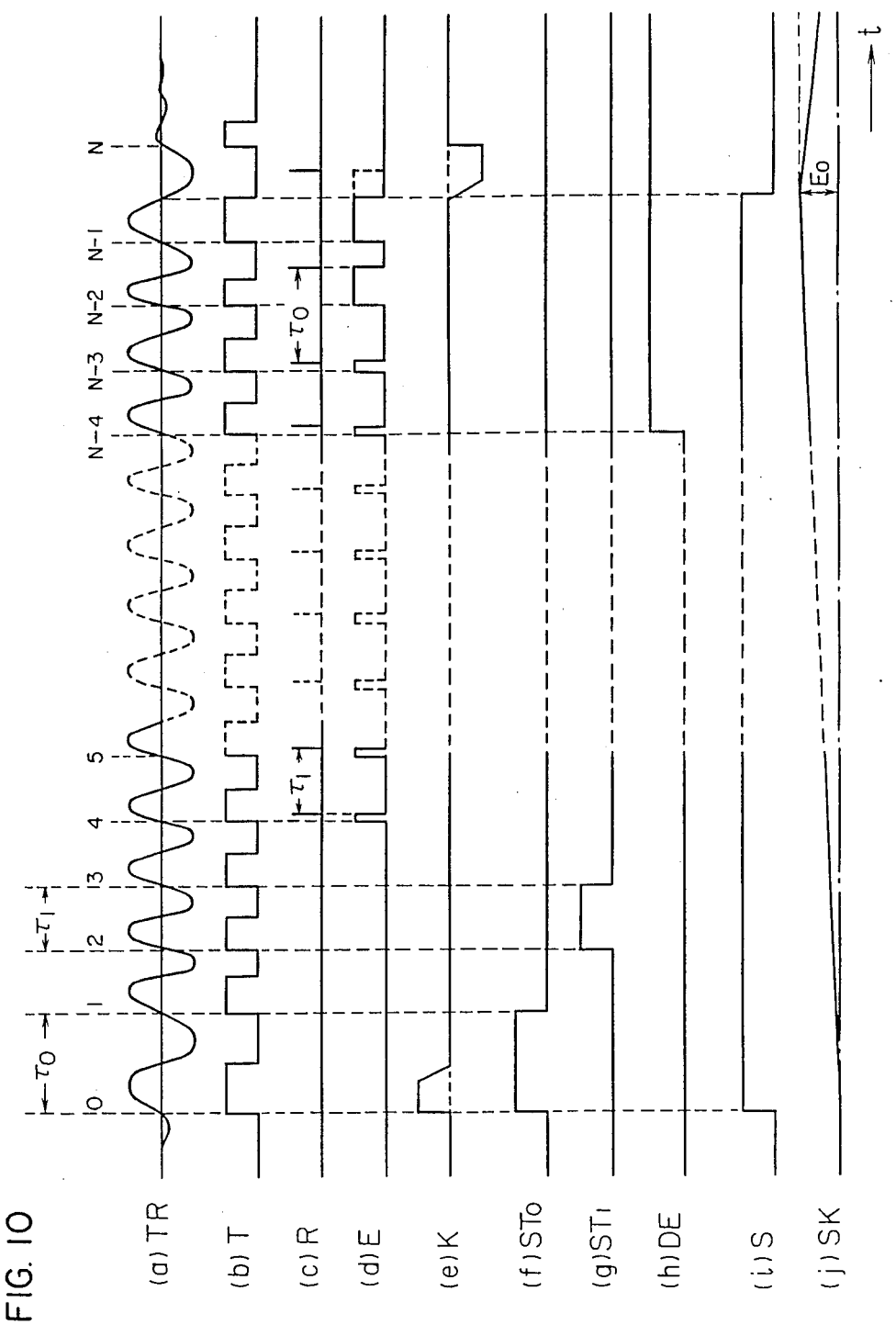
FIG. 10 shows signal waveforms of signals in FIGS. 8 and 9.

Referring to FIGS. 8, 9 and 10, other embodiment of the present invention is explained.

FIG. 10(a) shows a tracking error signal waveform T, FIG. 10(b) shows a tracking error signal waveform TP shaped into a rectangular waveform, FIG. 10(c) shows a reference signal waveform R, FIG. 10(d) shows a phase error signal waveform E, FIG. 10(e) shows a power product waveform K, FIGS. 10(f) and 10(g) show readout signal waveforms $ST_0$ and $ST_1$, FIG. 10(h) shows a compare equal signal waveform DE, FIG. 10(i) shows a tracking group signal waveform TL, and FIG. 10(j) shows an integration output waveform SC.

In FIG. 9, the like elements to those shown in FIG. 6 are designated by the like numerals and the explanation thereof is omitted.

The continuous jump operation when the read beam is moved from an inner periphery to an outer periphery is now explained. As the continuous jump command and the number of tracks for jump are applied to the terminal 810, the system control circuit 800 sends a binary-converted number D of tracks for jump to a memory 730. If also sends a jump direction signal P for indicating the direction of jump (from the inner periphery to the outer periphery or vice versa) to an output voltage polarity converter 910 and an exclusive OR circuit 240. As a jump trigger signal J is applied to a set terminal S of an RS flip-flop 760, the flip-flop 760 is set and an output thereof, a tracking loop signal TL assumes a high level as shown in FIG. 10(f). This output is applied to the loop switch 420 through an inverter 770 so that the switch 420 turns off the tracking control loop during the low level period of the output of the inverter 770. The signal TL is also supplied to the output voltage polarity converter 910, which produces a positive or negative pulse voltage depending on a level of the jump polarity signal P. This pulse voltage is supplied to a differential and reshaping circuit 920 and an integration circuit 930. The circuit 920 differentiates the output of the output voltage polarity converter 910 and reshapes it to produce a pair of power product pulses having opposite polarities and equal magnitude as shown in FIG. 10(d). A first power product pulse is supplied to the actuator 300 through the adder 430 and the driver 450. As a result, the actuator 300 starts the continuous jump operation in the direction determined by the jump polarity signal P.

As a result, the sinusoidal tracking error signal T having a period equal to the track interval as shown in FIG. 10(a) appears in the output of the tracking error detector 210. The signal T is shaped into a rectangular wave by the reshpaing circuit 230. The output of the reshaping circuit 230 is supplied to the EX-OR circuit 240 and an effective edge is discriminated by the prerriously applied jump polarity signal P. A rising edge in the rectangular waveform of FIG. 10(b) corresponding to negative-to-positive zero-crossing of the signal T when the actuator 300 moves across the track is the effective edge. The output TP of the EX-OR circuit 240 is sent to a counter 720 through an AND circuit 710 so that the counter 720 counts the number of tracks for jump. The AND circuit 710 also has a function of gating the signal T only when the signal TL applied to the other terminal is high level. The jump command signal J is supplied to the reset terminal of the counter 720 so that it is reset for every continuous jump. The output TP of the EX-OR circuit 240 is supplied to the velocity detector 600.

The velocity detector 600 pruduces a reference signal R of a predetermined frequency based on the detected velocity of the actuator. The reference signal R is supplied to the phase comparator 560 to which the reshaped tracking error signal TP from the EX-OR circuit 240 is supplied. As the velocity of the moving actuator varies, the frequency of the tracking error signal varies accordingly. Therefore, by phase-comparing the effective edges of the reference signal R and the reshaped tracking error signal by the phase comparator 560, the phase comparator 560 produces a phase error signal E representing the phase difference therebetween as shown in FIG. 10(e). The jump polarity signal P is supplied to the phase comparator 560 so that the polarity of the phase detection characteristic is reversed depending on whether the actuator moves from an inner periphery to an outer periphery or vice versa.

The phase error signal E produced by the phase comparator 560 is supplied to the loop switch 580 through the phase compensation amplifier 570. A signal S from the velocity detector 600 which indicates that the actuator has moved across the third track is applied to the loop switch 580 so that the switch 580 is closed. As a result, the phase error signal E is applied to the actuator 300 through the adder 430 and the drive circuit 450 to establish the velocity control loop. Thus, the phases of the tracking error signal TR and the reference signal R are locked, the frequency of the signal TR perfectly matches to the frequency of the signal R by the negative feedback control effect, and the velocity of the actuator is kept at the constant speed determined by the reference signal R.

The output of the output polarity converter 910 is supplied to the integration circuit 930, which produces the integration signal SC shown in FIG. 10(j). The signal SC is applied to the actuator through the adder 430 and the drive circuit 450. The circuits are designed such that a force generated by the integration output SC cancels the repelling force of a resilient member which supports the actuator. As a result, the affect of the force generated by the resilient member in accordance with the displacement of the actuator is eliminated.

The operation of the velocity detector 600 is explained in further detail. FIG. 8 shows a detailed block diagram of the velocity detector 600. The reshaped tracking error signal TP from the EX-OR circuit 240 is supplied to the edge detector 620 which detects the effective edge (rising edge in the present embodiment) and sends an edge detection signal to the reset terminal of the binary counter 610 and the control circuit 650. The binary counter 610 is reset by every edge detection signal so that it always counts the period of the signal T by using the reference signal CK of the constant frequency supplied from the reference signal generator 605. The signal TL from the flip-flop circuit 760 is supplied to the control circuit 650. When the signal TL is high level, the control circuit 650 produces the readout signals $ST_0$ and $ST_1$ as shown in FIGS. 10(g) and 10(h) in synchronism with the edge detection signal, and those signals are supplied to a main memory 640 and a sub-memory 630. The main memory 640 and the sub-memory 630 hold binary data which are produced by the binary counter 610 by counting the periods $\tau_1$ to $\tau_0$ of FIG. 10(a). The binary data for the period $\tau_1$ held in the memory 630 is supplied to the Y terminal of the switch 660, and the binary data for the period $\tau_0$ held in the memory 640 is supplied to the X terminal of the switch 660. The switch 660 is switchd by the control signal from the synchronization circuit 680. The output from the switch 660 is supplied to the oscillator 670, which generates the reference signal R having the period $\tau_0$ or $\tau_1$ based on the binary data by using the reference signal CK supplied from the reference signal generator 605. The reference signal R is supplied to the Z terminal of the switch 690. The edge detection signal for the signal T from the edge detector 620 is supplied to the W terminal of the switch 690, and the switch 690 is switched by the control signal from the control circuit 650. The output of the switch 690 is supplied to the phase comparator 560 as the reference signal R. Immediately after the start of the jump operation, the switch 690 is connected to the W terminal and the reference signal R is the tracking error signal T. Thus, no phase error signal appears in the output of the phase comparator 560. The control circuit 650 keep the switch 690 connected to the W terminal until the memories 630 and 640 complete to hold the binary data for the periods of the signal T, and when they complete, the control circuit 650 generates the control signal to connect the switch 690 to the Z terminal. Since the switch 660 is initially connected to the X terminal, the oscillator 670 produces the reference signal R having the period equal to the shorter period $\tau_1$ of the tracking error signal T as shown in FIG. 10(c). As a result, the velocity of the actuator is equal to the velocity corresponding to the period $\tau_1$.

On the other hand, the memory 730 of FIG. 9 which stores the mumber of jumping tracks contains the number N of jumping tracks less the number of stages of the shift register 750 (four stages in the presnet embodiment). The content of the memory 730 and the content of the binary counter 720 are supplied to the comparator 740. The binary counter 720 counts the number of jumping tracks. When the contents of the memory 730 and the counter 720 coincide, (when the actuator reaches fourth track before the target track in the present embodiment), the comparator 740 produces the compare equal signal DT, which is supplied to the synchronization circuit 680 of FIG. 8. The reference singal R from the reference signal generator 40 is supplied to the synchronization circuit 680. When it receives the compare equal signal DT, it switches the switch 660 from the X terminal to the Y terminal in synchronism with the reference signal R so that the phase of the reference signal R does not become discontinuous. As a result, the binary data fòr the longer period $\tau_0$ held in the sub-memory 630 is applied to the reference signal generator 670 through the switch 660 so that the period of the reference signa R changes from $\tau_0$ to $\tau_1$. Thus, by using the synchronization circuit 680, the period of the reference signal R can be switched without malfunctioning the succeeding stage phase comparator 560.

As the period of the signal R is exprnded, the pulse width of the phase error signal is widened as shown in FIG. 10(d) and the velocity control loop functions to bring the repetition period of the tracking error signal T to be equal to the period $\tau_0$. As a result, the actuator movement is decelerated. On the other hand, the compare equal signal DT from the comparator 740 is supplied to the shift register 750. The reshaped tracking error signal T is supplied to the shift register 750. The shift register 750 is triggered by the falling edge which indicates the positive-to-negative zero-crossing of the signal T, and delays the compare equal signal DT by four track periods and then supplies the reset signal to the reset terminal of the flip-flop circuit 760. Thus, the flip-flop circuit 760 is reset at one half track before the target track and the tracking loop signal TL is returned to the low level. As a result, the loop switch 580 is opened and the velocity control by the shase error signal E is terminated, and the loop switch 420 is closed to turn on the tracking control loop. The second power product pulse shown in FIG. 10(e) is produced by the differentiation and reshaping circuit 920 and it is applied to the actuator 300 through the adder 430 and the drive circuti 450 as a result, the actuator movement is further decelerated. Although there is no assurance that the actuator 300 is on the target track at that momemt, it can be positively set to the target track by the pull-in function of the tracking control loop.

In the above description, the continuous jump operation is in one direction. When the jump operation is to take place in the opposite direction, the jump polarity output P from the system control circuit 800 is reversed. As a result, the outputs from the differentiation and reshaping circuit 920, integration circuit 930 and phase comparator 560 are opposite to those shown in FIG. 10. Thus, even if the polarity of the tracking error signal is reversed, the polarity of the edge in the output of the EX-OR circuit 240 which is generated when the actuator moves across the track is same, and the continuous jump operation to the target track is attained in the similar manner.

In accordance with the present invention, the actuator can be moved across a plurality of tracks stably at a highest velocity. Since the velocity is detected at every jump operation, the reference signal is generated to comply with the optical disk of any track pitch or the actuator of any characteristic, and a chance of success of the continuous jump operation for controlling the velocity is high.

In the embodiment shown in FIG. 9, the phase comparator is used as the velocity control means, although other velocity control means may be used. The detection period for the velocity of the actuator may be advanced or retarded or it may be one half of the repetition cycle of the tracking error signal. Any such modification may be made withoug departing from the spirit of the presnet invention.

As described hereinabove, according to the present invention, the actuator of the apparatus for reproducing the information recorded on the disk can be stably moved across the plurality of tracks by one jump operation, the number of jumping tracks can be precisely controlled and the actuator is moved at the highest velocity except for the acceleration and deceleration periods. Accordingly, the access time is short. Further, since the velocity of the actuarot is equal to the highest velocity in the track-by-track jump operation, the actuator can be easily set to the target track.

While particular embodiments of the invention have been shown and described, it will be obvious to these skilled in the art that various changes and modifications may be made without departing from the present invention in its broader aspect.

We claim:

1. An apparatus for reproducing information recorded on a disk having a tracking servo device for read beam moving means for directing a read beam to a track on said disk, comprising:
   a velocity detector means for applying a first power product to a tracking servo read beam moving means upon turn-off of a tracking servo loop, and detecting a velocity of said moving means at the start of movement of said moving means based on an error signal of said tracking servo device;
   a standard signal generator means for generating a standard signal to said velocity detector means,
   a reference signal generator means for generating a reference signal corresponding to the velocity of said moving means based on the output of said velocity detector means;
   velocity control means for controlling the velocity of said moving means by comparing said error signal with said reference signal;
   correction means for applying to said moving means a force for substantially cancelling a force corresponding to a displacement of said moving means and developed in support means for supporting said moving means;
   a shaping circuit for shaping said error signal into a rectangular waveform;
   count means for pulse-counting the output from said shaping circuit to detect the number of tracks across which said moving means has moved to count a desired number of tracks; and
   means for closing said tracking servo loop approximately one half track before a target track to which said moving means is to be moved based on the content of said count means, and applying to said moving means a second power product which is opposite in polarity and equal in magnitude to said first power product to move said moving means across the predetermined number of tracks.

2. An apparatus for reproducing information recorded on a disk having a tracking servo device for read beam moving means for directing a read beam to a track on said disk, comprising:
   a velocity detector means for applying a first power product to a tracking servo read beam moving means upon turn-off of a tracking servo loop, and detecting a velocity of said moving means at the start of movement of said moving means based on an error signal of said tracking servo device;
   a standard signal generator means for generating a standard signal to said velocity detector means;
   a first memory means for holding a first velocity detected by said velocity detector means immediately after said moving means has started movement;
   a second memory means for holding a second velocity detected when said moving means has been moved across a predetermined number of tracks after the start of movement;
   a first reference signal generator means for generating a first reference signal corresponding to the content of said first memory when said moving means is several tracks before the target track;
   first velocity control means for comparing said error signal with said first reference signal to change the velocity of said moving means from the second velocity to the first velocity;
   a second reference signal generator means for generating a second reference signal corresponding to the content of said second memory;
   second velocity control means for comparing said error signal with said second reference signal to change the velocity of said moving means to the second velocity;
   correction means for applying to said moving means a force for substantially cancelling a force corresponding to a displacement of said moving means and developed in support means for supporting said moving means;
   a shaping circuit for shaping said error signal into a rectangular waveform;
   means for pulse-counting the output of said shaping circuit to detect the number of tracks across which said moving means has moved and counting the number of tracks which is equal to a desired number of tracks less several tracks;
   count means for counting the desired number of tracks; and
   means for closing said tracking servo loop approximately one half track before a target track to which said moving means is to be moved based on the content of said count means, and applying to said moving means a second power product which is opposite in polarity and equal in magnitude to said first power product to move said moving means across the predetermined number of tracks.

* * * * *